(12) United States Patent
Burger et al.

(10) Patent No.: US 11,027,406 B2
(45) Date of Patent: Jun. 8, 2021

(54) HAND MACHINE TOOL

(71) Applicant: Hilti Aktiengesellschaft, Schaan (LI)

(72) Inventors: Helmut Burger, Prittriching (DE); Thomas Thanner, Munich (DE); Rene Richter, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 1288 days.

(21) Appl. No.: 14/406,480

(22) PCT Filed: May 29, 2013

(86) PCT No.: PCT/EP2013/061009
§ 371 (c)(1),
(2) Date: Dec. 8, 2014

(87) PCT Pub. No.: WO2013/186047
PCT Pub. Date: Dec. 19, 2013

(65) Prior Publication Data
US 2015/0151423 A1 Jun. 4, 2015

(30) Foreign Application Priority Data
Jun. 13, 2012 (DE) .......................... 102012209925.3

(51) Int. Cl.
*H02K 7/14* (2006.01)
*B25F 5/02* (2006.01)
*B25F 5/00* (2006.01)

(52) U.S. Cl.
CPC .............. *B25F 5/02* (2013.01); *B25F 5/006* (2013.01); *H02K 7/145* (2013.01)

(58) Field of Classification Search
CPC .. H02K 7/14; H02K 7/145; B25F 5/00; B25F 5/02; B25F 5/006; H01M 2/1016;
(Continued)

(56) References Cited

U.S. PATENT DOCUMENTS 3,679,958 A * 7/1972 Chambers ............... B26B 7/005
310/50
4,447,749 A * 5/1984 Reeb, Jr. ................. B23B 45/02
310/50
(Continued)

FOREIGN PATENT DOCUMENTS

AT 28162 4/1907
CN 1416599 A 5/2003
(Continued)

OTHER PUBLICATIONS

JP 08213087 A (English Translation).*

*Primary Examiner* — Quyen P Leung
*Assistant Examiner* — Alexander Moraza
(74) *Attorney, Agent, or Firm* — Davidson, Davidson & Kappel, LLC

(57) ABSTRACT

The hand machine tool according to the invention has an integrated tool or a tool holder 2 to receive a tool 4. An electric motor 5 serves to drive the tool 4 or the tool holder 2. A battery pack 18 for supplying power to the electric motor 5 can be pushed into a guide 23 in a first direction. A plurality of electrical contacts 31 for contacting counter contacts 32 of the battery pack 18 are disposed in a contact holder 36. Wires 40, which are connected in each case to one of the electrical contacts 31, have cores which extend in a wave-like manner in the first direction 28 adjacent to the electrical counter contact 32.

10 Claims, 4 Drawing Sheets

(58) Field of Classification Search
CPC ............... B25D 17/00; B25D 2217/00; B25D 2250/095; B25D 2250/091
USPC ...................................................... 310/50, 47
See application file for complete search history.

(56) References Cited

U.S. PATENT DOCUMENTS

| | | | |
|---|---|---|---|
| 5,964,601 A * | 10/1999 | Tsurumaru | B60R 11/02 439/141 |
| 6,087,815 A * | 7/2000 | Pfeifer | B25F 5/00 323/282 |
| 6,551,123 B1 | 4/2003 | Schaeffeler et al. | |
| 6,822,420 B2 | 11/2004 | Kozu et al. | |
| 7,883,355 B2 | 2/2011 | Glauning et al. | |
| 2002/0002013 A1* | 1/2002 | Baldock | H01R 25/147 439/625 |
| 2004/0017177 A1 | 1/2004 | Santana et al. | |
| 2004/0242043 A1 | 12/2004 | Buck et al. | |
| 2007/0114051 A1* | 5/2007 | Ege | B25D 17/043 173/217 |
| 2007/0117477 A1 | 5/2007 | Ege et al. | |
| 2009/0004908 A1* | 1/2009 | Ceroll | B25F 5/00 439/447 |
| 2010/0148725 A1 | 6/2010 | Hirt | |
| 2010/0221594 A1* | 9/2010 | Ro kamp | A01G 3/053 429/100 |
| 2010/0285698 A1 | 11/2010 | Lee | |
| 2011/0303717 A1* | 12/2011 | Miescher | B25F 5/00 227/2 |

FOREIGN PATENT DOCUMENTS

| | | |
|---|---|---|
| CN | 102113185 A | 6/2011 |
| DE | 43 44 635 | 8/1995 |
| DE | 19604346 A1 | 8/1996 |
| DE | 102005020358 | 11/2006 |
| DE | 602004013398 | 6/2009 |
| DE | 10 2008 0546 | 6/2010 |
| EP | 1 787 760 | 5/2007 |
| EP | 1 787 764 | 5/2007 |
| EP | 1787760 | 5/2007 |
| EP | 2223779 | 9/2010 |
| EP | 2301119 B1 | 5/2015 |
| GB | 1374202 | 11/1974 |
| GB | 1389301 | 4/1975 |
| JP | 5526594 | 7/1980 |
| JP | 08213087 A * | 8/1996 |
| JP | 2003 297 312 | 10/2003 |
| JP | 2005332643 | 12/2005 |
| JP | 2010532908 | 10/2010 |
| WO | WO 2010/002776 | 1/2010 |
| WO | WO 2010002776 A2 * | 1/2010 ................ B25F 5/02 |

* cited by examiner

HAND MACHINE TOOL

FIELD OF THE INVENTION

The present invention relates to a hand-held power tool, e.g., a drill hammer, a saw, or a nail gun. Electrical consumers of the hand-held power tool, in particular of an electric motor, are supplied by a battery pack. The battery pack is removable from the hand machine tool. The battery pack may then be inserted into a charger for charging or be replaced with an identical charged battery pack.

BACKGROUND

A drill hammer generates strong vibrations which cause stress on a mounting and the electrical contacts of the battery pack. The electrical contacts are thus not only subject to mechanical wear, but also to arcs created during opening and closing of the contacts.

SUMMARY OF THE INVENTION

The present invention provides a hand machine tool that has an integrated tool or a tool holder for accommodating a tool. An electric motor is used to drive the tool or the tool holder. A battery pack is insertable into a guide along a first direction for supplying the electric motor with power. Multiple electrical contacts for contacting counter contacts of the battery pack are situated in a contact holder. Strands, which are connected in each case to one of the electrical contacts, have wires which have a wave-shaped progression along the first direction adjoining the electrical contact.

The wires may be braided with each other to form a strand, for example, whereby the wave-shaped progression is obtained. As an alternative or in addition, the entire strand may be situated in the contact holder in a wave-shaped manner. Based on an axis extending in parallel to the first direction, the distance of the strand from the axis changes repeatedly, preferably periodically, along its progression along the axis. The wave shape may be sinusoidal, or saw tooth-shaped, for example.

One embodiment provides for the contact holder to include a terminal strip, and for one end of a strand to be attached in the terminal strip and another end of the strand to be attached to one of the contacts. The strand and the electrical contact connected to the strand are mechanically decoupled from the further wire harness inside the hand machine tool. The forces introduced by the outer wire harness are transferred from the terminal strip to the contact holder.

One embodiment provides for a length of the strand to be greater than a distance of the terminal strip from the one contact. The strand is not stretched inside the contact holder. The strand is thus softer with respect to a longitudinal shift of the electrical contact and is able to resiliently absorb the longitudinal shift.

One embodiment provides for the strand to have no insulating tubing between the terminal strip and the contact. The strand formed entirely of metallic wires proves to have a stronger damping effect for movements in the submillimeter range than the strands usually insulated with a heat-shrinkable tubing. The electrical contacts are preferably movably mounted in the contact holder.

The contact holder is preferably movably suspended with respect to the hand machine tool in a suspension of the hand machine tool along the first direction and along a third direction. A spring applies a force to the contact holder against the first direction. A front face pointing against the first direction is provided with a centering, which cooperates with a centering support on the battery pack to suppress a relative movement between the front face and the battery pack along the third direction. The contact holder rests against the battery pack, whereby a relative movement of the contacts of the hand machine tool and of the counter contacts of the battery pack in the millimeter range is suppressed.

BRIEF DESCRIPTION OF THE DRAWINGS

The following description explains the present invention based on exemplary specific embodiments and figures.

Identical or functionally equivalent elements are identified by identical reference numerals in the figures, unless indicated otherwise.

DETAILED DESCRIPTION

Figure 1:
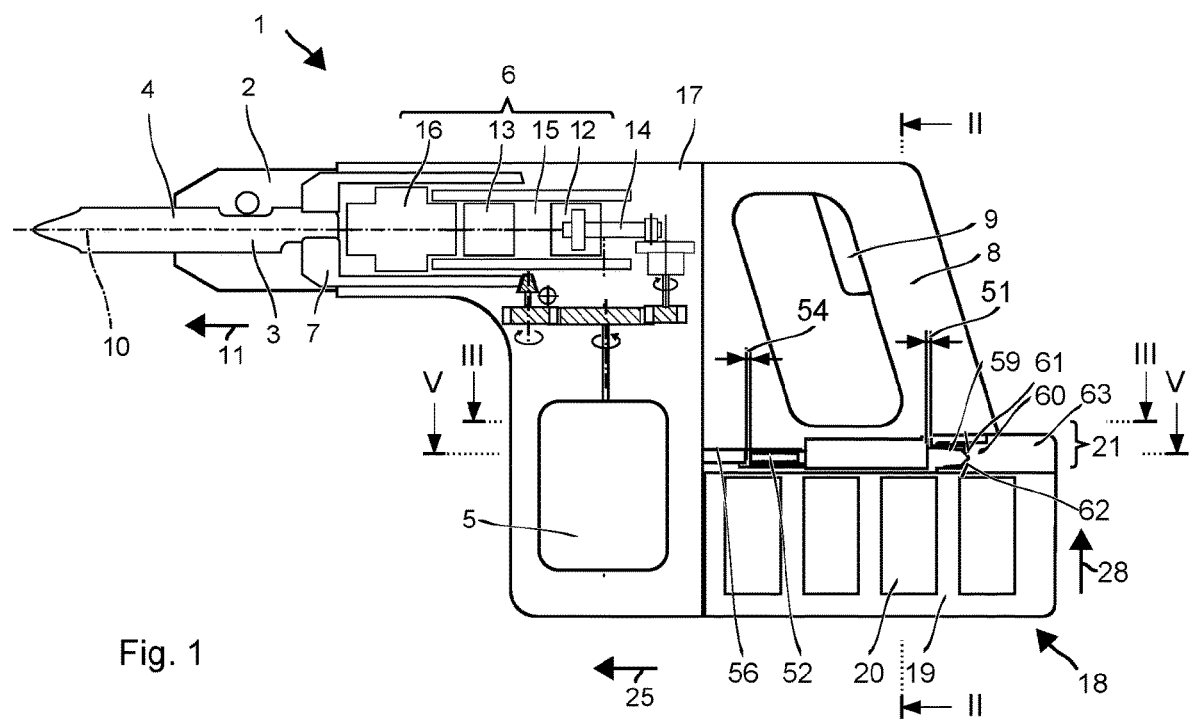
FIG. 1 shows a drill hammer.

FIG. 1 schematically shows a drill hammer 1 as one example of a hand machine tool. Drill hammer 1 has a tool holder 2, into which a shaft end 3 of a tool, e.g., one of drill bit 4, may be inserted. An electric motor 5, which drives a hammer mechanism 6 and an output shaft 7, forms a primary drive of drill hammer 1. A user may guide drill hammer 1 with the aid of a handle 8 and put drill hammer 1 into operation with the aid of a system switch 9. During operation, drill hammer 1 continuously rotates drill bit 4 about a working axis 10 and may strike drill bit 4 in percussion direction 11 along working axis 10 into a substrate.

Hammer mechanism 6 is a pneumatic hammer mechanism 6, for example. An exciter 12 and a striker 13 are movably guided in hammer mechanism 6 along working axis 10. Exciter 12 is coupled to motor 5 with the aid of an eccentric 14 or a wobble finger and is forced to carry out a periodic, linear movement. A pneumatic spring, formed by a pneumatic chamber 15 between exciter 12 and striker 13, couples a movement of striker 13 to the movement of exciter 12. Striker 13 may strike directly onto a rear end of drill bit 4 or transfer its pulse to drill bit 4 indirectly via an essentially resting intermediate striker 16. Hammer mechanism 6, and preferably the further drive components, are situated inside a machine housing 17.

Figure 2:
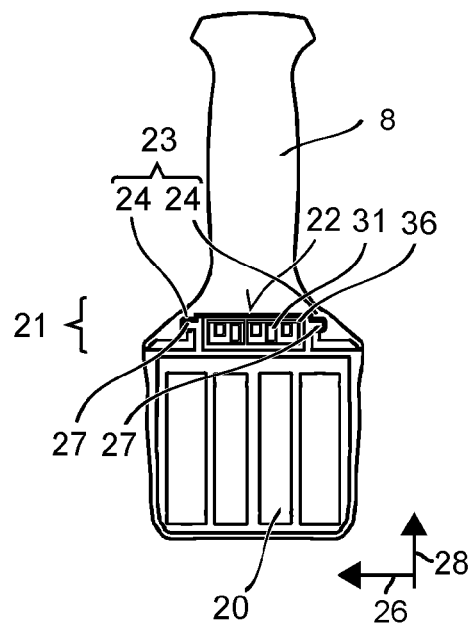
FIG. 2 shows a cross section through the drill hammer in plane II-II.

Electric motor 5 is supplied with power by a battery pack 18. Battery pack 18 has a battery housing 19 which is separated with respect to drill hammer 1 and in which multiple battery cells 20 are situated. Battery pack 18 may be inserted into and removed from a mounting 21 of drill hammer 1. Mounting 21 is preferably formed on an essentially exterior surface 22 of machine housing 17 or of handle 8. Mounting 21 has a guide 23 made of two parallel grooves 24, for example, which are oriented along an insertion direction 25 and situated offset from each other in a second (horizontal) direction 26 (FIG. 2). Battery housing 19 of battery pack 18 is provided with two parallel rails 27 having an L-shaped profile. Battery housing 19 may be inserted with its rails 27 into grooves 24 of guide 23 and inserted along insertion direction 25 predefined by guide 23. Guide 23 and battery housing 19 alternatingly engage behind each other along a third (vertical) direction 28. Battery pack 18 is mounted by guide 23 in orthogonal directions 26, 28 with respect to insertion direction 25, preferably without or with little play.

Figure 3:
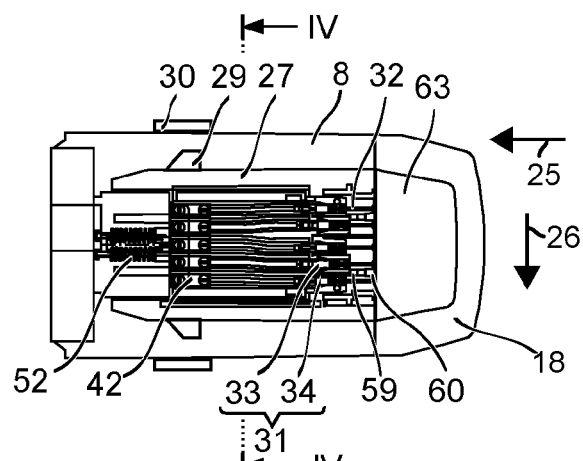
FIG. 3 shows a cross section through the drill hammer in plane III-III.

Mounting 21 is provided with depressions oriented perpendicularly to guide 23, into which locking pins 29 of battery pack 18 may engage (FIG. 3). Locking pins 29 are preferably pretensioned by springs and snap into place as soon as battery pack 18 has been inserted into mounting 21 up to a stop. Locking pins 29 lock battery pack 18 against a movement along insertion direction 25. The user may disengage locking pins 29 from mounting 21 by actuating a push button 30 to be able to pull battery pack 18 out of mounting 21 against insertion direction 25. The design of guide 23 is only exemplary; in particular, mounting 21 may be provided with locking pins 29 and/or mounting 21 may be provided with rails 27 having an L-shaped profile.

Mounting 21 is provided with electrical contacts 31, which contact electrical counter contacts 32 of battery pack 18. The contact is established when battery pack 18 is locked in guide 23. Contacts 31 are preferably situated next to each other along second direction 26, and otherwise are preferably situated at the same height, in particular along third direction 28.

Advantageously two current-conducting contacts 33 and two or more signal-conducting contacts 34 are provided. Current-conducting contacts 33 are designed for more than 10 amperes to supply drill hammer 1 with power. Contacts 31 are made up entirely of metal; in view of the mechanical loads of a drill hammer 1, they are made up of iron, copper or iron-containing copper alloys. Signal-conducting contacts 34 are designed for a lower load since currents of less than 10 mA flow over these.

Electrical contacts 31 of drill hammer 1 are slotted jacks. Opposing jaws 35 of contact 31 may have a resilient design. During insertion of electrical counter contacts 32 of battery pack 18 between jaws 35, these resilient jaws 35 are preferably pushed apart and thus clamped against counter contacts 32. Electrical counter contacts 32 of battery pack 18 may be designed as blades. The slots or blades preferably extend in parallel to third, vertical direction 28.

Figure 5:
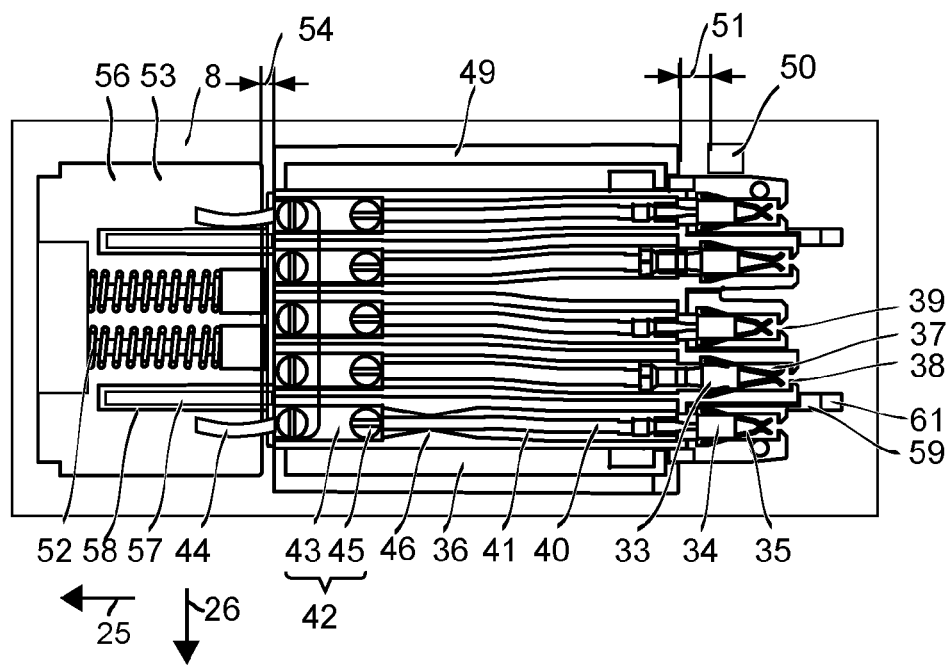
FIG. 5 shows a top view onto a contact holder.
Figure 6:
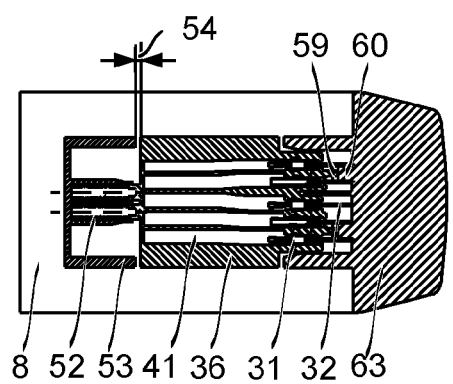
FIG. 6 shows a cross section through the drill hammer in plane V-V.

Electrical contacts 31 are inserted into an electrically insulating contact holder 36 (FIG. 5). Contacts 31 are situated next to each other and are spaced apart from each other in second direction 26. Contact holder 36 preferably has a separate accommodating space 37 for each of electrical contacts 31, in particular of current-conducting contacts 33. Electrical contact 31 may move in accommodating space 37 along insertion direction 25; the play is in the range of 0.1 mm to 0.3 mm, for example. Electrical contacts 31 may include spring-loaded wings, which project in second direction 26 and with which electrical contacts 31 are supported against the side walls of accommodating spaces 37. Due to their movable arrangement, contacts 31 are movable with respect to each other within contact holder 36. Accommodating spaces 37 are open on a front face 38 pointing against insertion direction 25. Counter contacts 32 of battery pack 18 may be inserted through opening 39 into accommodating spaces 37 and to electrical contacts 31 situated therein.

A strand 40 is clamped to each of contacts 31 or is clamped to electrical counter contact 32 (FIG. 5). Strands 40 are guided in contact holder 36 in a channel 41 in each case. In the shown specific embodiment, a terminal strip 42 is provided in contact holder 36. One end of strands 40 is attached to one of contacts 31 and the other end is attached in terminal strip 42. Terminal strip 42 mechanically decouples strands 40 from the wiring inside drill hammer 1. In this way, in particular a transfer of torsional forces of the lines which are partially twisted during installation to strands 40 is suppressed. The torsional forces could otherwise result in counter contacts 32 becoming clamped against side walls of accommodating spaces 37. Strands 40 are composed of braided wires. Strands 40 braided into a braid preferably have no insulating plastic jacket for at least 2 cm inside contact holder 36. The braid may be deformed by the introduced torsional forces and thus decouples the same from contacts 31. Strands insulated with a heat-shrinkable tubing or strands with twisted wires prove to be unfavorable for this purpose, as do even strands having very fine wires.

Terminal strip 42 is situated on the end of contact holder 36 facing away from front face 38, for example. Terminal strip 42 may be provided with electromechanical coupling pieces 43. Coupling piece 43 connects strand 40 to another cable 44, which is guided into machine housing 17. Coupling piece 43 is designed, for example, as a luster terminal having two screws 45 for fixing strand 40 and cable 44. Coupling pieces 43 are immovably inserted into contact holder 36. As an alternative or in addition to coupling pieces 43, terminal strip 42 may include a constriction 46 in channel 41 into which strand 40 is squeezed.

Figure 4:
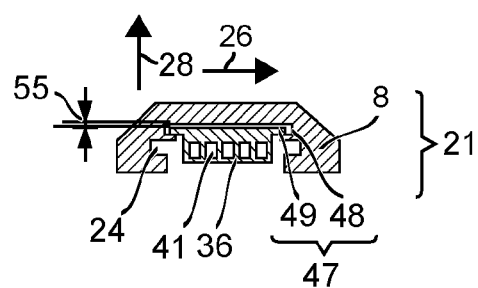
FIG. 4 shows a partial section through a suspension.

Contact holder 36 is movably suspended with respect to machine housing 17. A suspension 47 of contact holder 36 allows a limited movement of contact holder 36 along insertion direction 25. For this purpose, suspension 47 may have longitudinal grooves 48 in machine housing 17, for example, in which guide rails 49 engage on contact holder 36 (FIG. 4). Stops 50, 53 on both sides of contact holder 36 limit the movement to a travel distance 51, 54 of 2 mm to 5 mm in total, for example. One or multiple springs 52, e.g., helical springs, act on contact holder 36 against insertion direction 25. While battery pack 18 is not inserted, springs 52 press contact holder 36 against front stop 50 in insertion direction 25. Springs 52 are placed under pretension. During insertion of battery pack 18, contact holder 36 is entrained by battery pack 18 against the force of springs 52 in insertion direction 25. Travel distance 51, 54 is dimensioned in such a way that contact holder 36 is still spaced apart from rear stop 53 in insertion direction 25 by a portion 54 of travel distance 51, 54 when lock 29 locks battery pack 18.

Contact holder 36 is also able to move slightly in suspension 47 along second direction 26, contrary to battery pack 18 in mounting 21. The clearance for the movement is preferably at least 1 mm in second direction 26. The distance of opposing longitudinal grooves 48 is greater by the clearance than the width of contact holder 36 in the area of guide rails 49.

Moreover, contact holder 36 is able to move freely along third direction 28 between vertical stops. Free travel distance 55 between the stops is in the range of 0.5 mm to 2 mm. The vertical stops are formed by groove walls of longitudinal grooves 48, for example, whose distance is greater by travel distance 55 than the dimension of guide rails 49 along vertical direction 28.

As an alternative or in addition, movable contact holder 36 may be suspended in a bracket 56 which is attached to handle 8 or machine housing 17. Bracket 56 is situated behind contact holder 36 in insertion direction 25. Contact holder 36 has one or multiple pins 57 projecting in insertion direction 25, which are inserted into jacks 58 of bracket 56. Jacks 58 are wider and higher than pins 57 to ensure the movability of contact holder 36 in second direction 26 and third direction 28. Springs 52 may be mounted in bracket 56 and be supported on bracket 56. Bracket 56 forms rear stop 53. Strands 40 or cables 44 may be guided in bracket 56 essentially in parallel to insertion direction 25.

Contact holder 36 is provided with a vertical centering 59 on front face 38. The vertically, i.e., along third direction 28, acting centering 59 engages in a complementary centering support 60 on battery pack 18. Springs 52 press centering 59 into centering support 60 and fix the relative vertical position of front face 38 with respect to battery pack 18 in a force-fit and form-locked manner. Front face 38 and mounting 21 continue to remain movable with respect to machine housing 17 and drill hammer 1. Front face 38 is able to move with respect to machine housing 17 by free travel distance 55 along vertical third direction 28. Centering 59 is dimensioned along insertion direction 25 in such a way that only centering 59 rests against battery pack 18. The remaining areas of contact holder 36 are spaced apart along insertion direction 25. Contacts 31, and counter contacts 32 contact each other or are inserted into each other.

Centering 59 shown by way of example is implemented with the aid of mandrels 59 projecting from front face 38. Mandrels 59 are wedge-shaped, pyramid-shaped or cone-shaped. A top surface 61 of mandrel 59 pointing toward machine housing 17 is inclined with respect to third direction 28. Top surface 61 moves away from machine housing 17 against insertion direction 25 along third direction 28. As an alternative or in addition to top surface 61, a bottom surface 62, which faces away from machine housing 17, may be inclined with respect to third direction 28. Bottom surface 62 ascends toward machine housing 17 against insertion direction 25 along third direction 28. Mandrels 59 are preferably situated along second direction 26 between counter contacts 32. In the preferred example, mandrels 59 directly adjoin accommodating spaces 37 of current-conducting contacts 33.

Battery pack 18 has a contact carrier 63, which is preferably immovably joined to battery housing 19. Contact carrier 63 is made of an electrically insulating material, for example a plastic material. Counter contacts 32 are immovably embedded in the plastic material. Counter contacts 32 are preferably designed as blades, which are situated in planes parallel to insertion direction 25 and third direction 28. Centering support 60 is situated between counter contacts 32, for example. Front face 64 of centering support 60 pointing in insertion direction 25 is provided with a notch, whose shape is designed complementary to mandrel 59. The notch preferably has a prismatic design, i.e., the cross section of the notch is constant along second direction 26. Centering 59 thus acts only in third direction 28 and does not exert any influence on a movement along second direction 26.

The arrangement of centering 59 and of centering support 60 directly next to current-conducting contacts 33 or counter contacts 32 proves to be advantageous even with stiff materials for contact holder 36 and contact carrier 63 to sufficiently suppress a relative movement along third direction 28 between current-conducting contacts 33 and counter contacts 32.

Centering 59 on front face 38 of contact holder 36 may be designed as a notch, and the centering support may be designed as a mandrel. The centering may moreover include both notches and mandrels, the centering supports having a corresponding complementary design.

Figure 7:
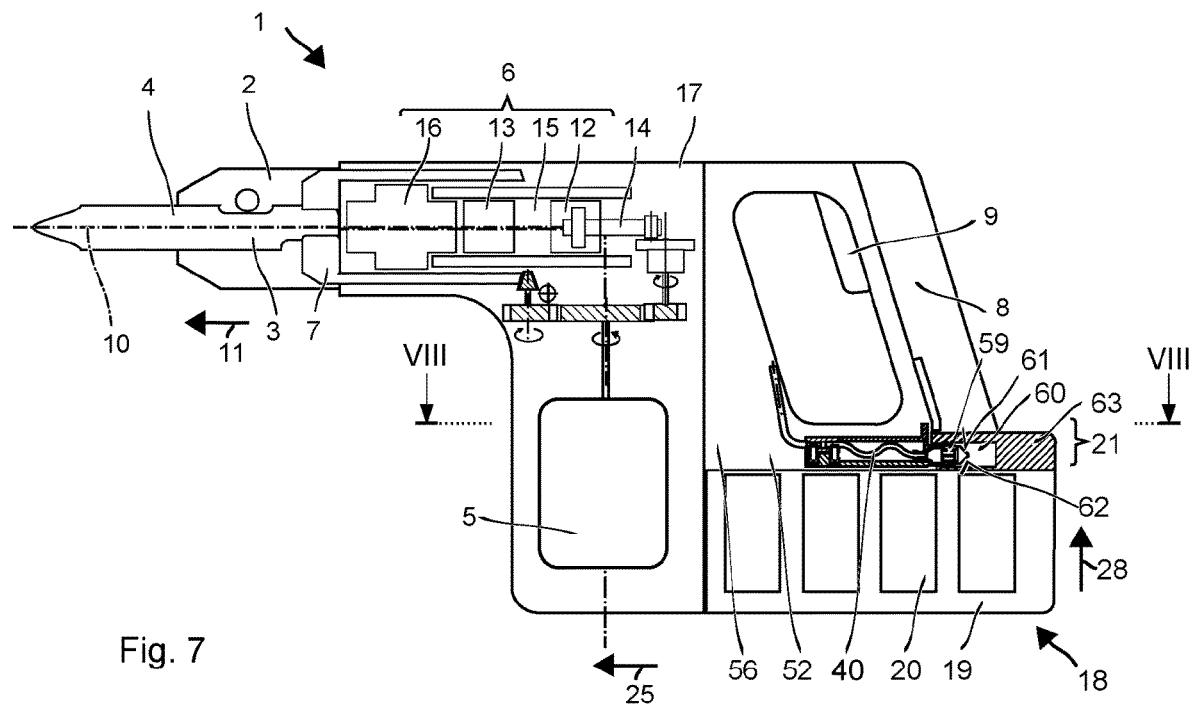
FIG. 7 shows a drill hammer.
Figure 8:
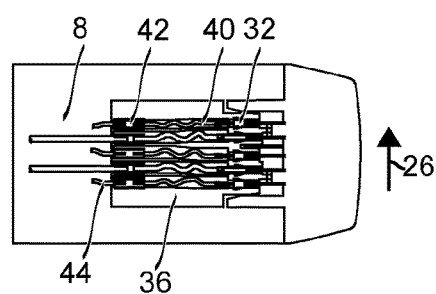
FIG. 8 shows a cross section through the drill hammer in plane VII-VII.

Strand 40 may be inserted in channel 41 in a wave shape (FIG. 7, FIG. 8). The dimension of channel 41 is at least 50% greater in second direction 26 than the cross section of strand 40. Strand 40 extends between terminal strip 42 and contacts 31. However, the length of strand 40 is at least 10% greater than the distance from terminal strip 42 and contacts 31. Strands 40 change their direction of progression multiple times along insertion direction 25 based on second direction 26 or third direction 28. In this way, effective damping of movements in the submillimeter range of the contacts could be achieved. The wires of strands 40 may be braided into a braid.

In addition to a chipping hammer, a nail gun for nails and bolts, and a saber saw, drill hammer 1 is one example of a battery-powered electric hand machine tool which is exposed to strong vibrations during operation and may be provided with movable contact holder 36. The nail gun generates strikes with the aid of the striker impacting the nails as a tool, which may result in a relative movement of the battery pack and the machine housing. In saws, in particular saber saws, the vibrations are generated by the saw blade and transferred to the machine tool.

The invention claimed is:

1. A hand machine tool comprising:
   an integrated tool or a tool holder for accommodating a tool;
   an electric motor for driving the integrated tool or the tool holder;
   a guide insertable into a battery pack along a first direction for supplying the electric motor with power; and
   a contact holder, wherein multiple electrical contacts are situated in the contact holder for contacting counter contacts of the battery pack;
   at least one strand connected to one of the electrical contacts situated in the contact holder of the hand machine tool and having wires having a wave-shaped progression along the first direction adjoining the electrical contact.

2. The hand machine tool as recited in claim 1 wherein the wires of the strand are braided.

3. The hand machine tool as recited in claim 1 wherein an entirety of the strand has a wave-shaped progression adjoining the electrical contact.

4. The hand machine tool as recited in claim 1 wherein the contact holder includes a terminal strip, and one end of the strand is attached in the terminal strip and another end of the strand is attached to one of the contacts.

5. The hand machine tool as recited in claim 4 wherein a length of the strand is greater than a distance of the terminal strip to the one contact.

6. The hand machine tool as recited in claim 4 wherein the strand has no insulating tubing between the terminal strip and the contact.

7. The hand machine tool as recited in claim 1 wherein the electrical contacts are movably mounted in the contact holder.

8. The hand machine tool as recited in claim 1 wherein the at least one strand is clamped to the electrical contact.

9. The hand machine tool as recited in claim 1 wherein the at least one strand is in the contact holder.

10. The hand machine tool as recited in claim 9 wherein the at least one strand is in a channel in the contact holder.

* * * * *